May 1, 1945.  W. R. RAY  2,374,701
THERMOELECTRIC DEVICE
Filed April 4, 1939  3 Sheets-Sheet 1
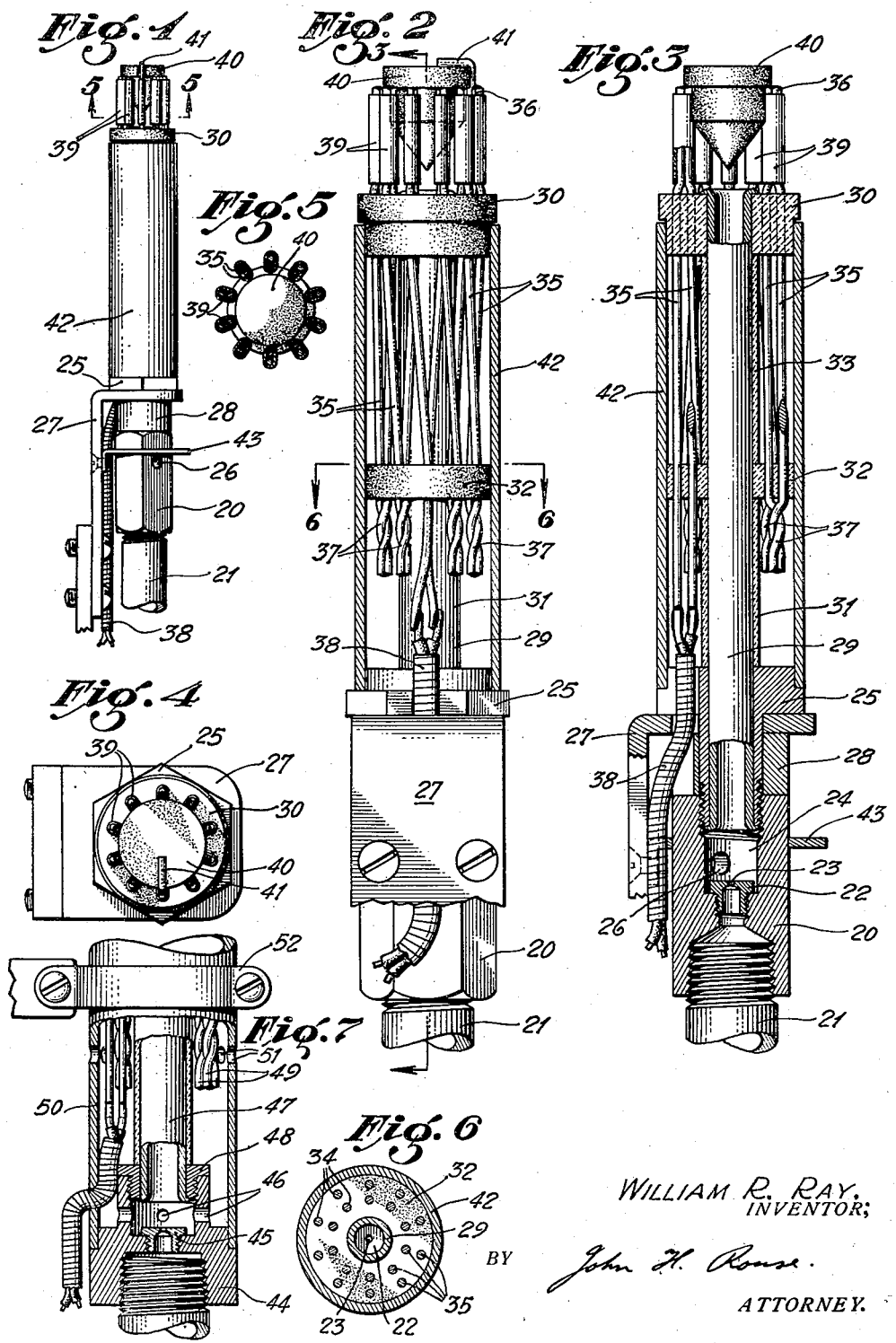
WILLIAM R. RAY,
INVENTOR;
BY John H. Rouse.
ATTORNEY.

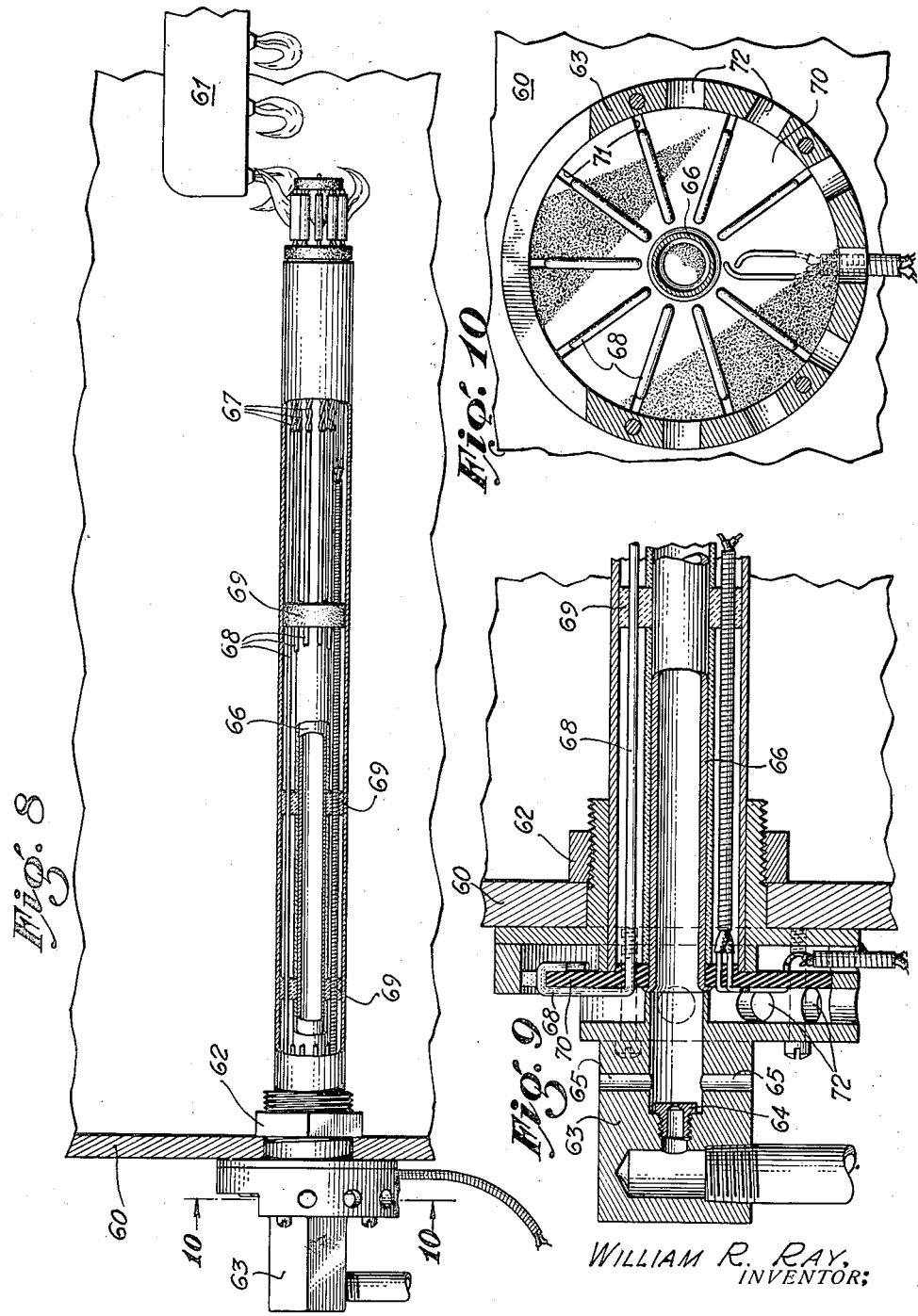

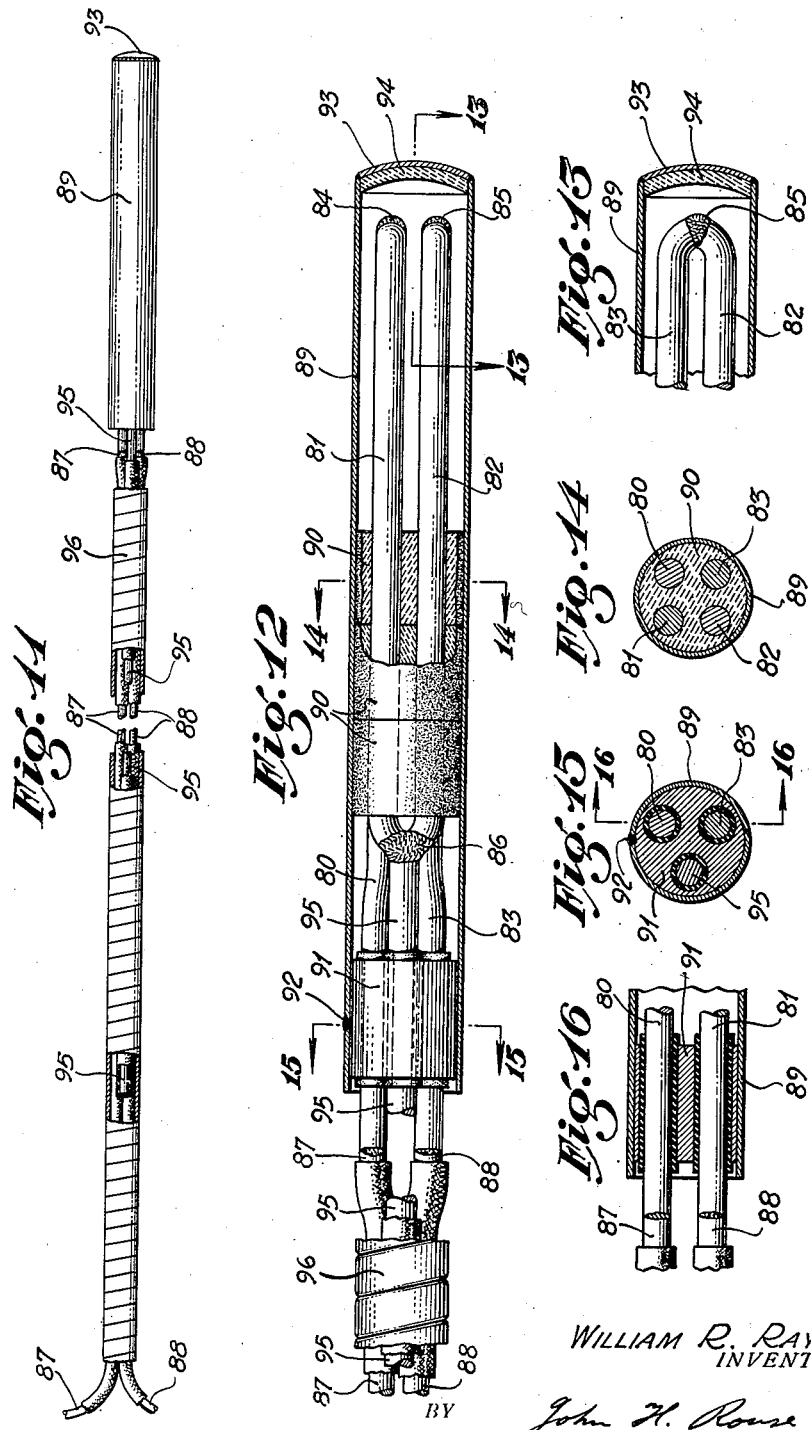

Patented May 1, 1945

2,374,701

UNITED STATES PATENT OFFICE 2,374,701

THERMOELECTRIC DEVICE

William R. Ray, Los Angeles, Calif.

Application April 4, 1939, Serial No. 265,974

5 Claims. (Cl. 136—4)

My present invention relates to improvements in thermoelectric generating devices and its general object is to increase the effectiveness of such devices.

A particular object of the invention is the provision of means for conducting heat away from, and thus cooling, the cold junctions of a thermoelectric generating device.

Another object is the provision of means for cooling the cold junctions by forced circulation of air therearound.

Another object is the provision in a thermoelectric generating device of novel and effective means for heating the hot junctions thereof.

Another object is the provision in a thermoelectric generating device of an efficient arrangement of a plurality of hot junctions and means for heating the same.

Other objects and advantages of the invention will be found in the description, the drawing and the appended claims.

For complete understanding of the invention, reference may be had to the following detailed description and accompanying drawings, wherein:

Figure 1 is a side elevational view, actual size, of a thermoelectric generating device embodying my invention;

Figure 2 is an enlarged back elevational view of the device shown in Fig. 1, the tubular housing being cut away to show the arrangement of the thermocouple wires and connections;

Figure 3 is a sectional view taken along the line 3—3 of Fig. 2;

Fig. 4 is a plan view of the device of Figs. 1, 2 and 3;

Figure 5 is an enlarged sectional view taken along the line 5—5 of Fig. 1;

Figure 6 is a sectional view taken along the line 6—6 of Fig. 2;

Figure 7 is an enlarged fragmentary view, mainly in section, of a modified form of thermoelectric generating device embodying features of my invention;

Figure 8 is a side elevational view, actual size, of another modified form of thermoelectric generating device embodying features of my invention and shown in association with a cooking oven burner, the tubular housing of the device being cut away to show structural details;

Figure 9 is an enlarged sectional view of a portion of the device shown in Fig. 8;

Figure 10 is an enlarged sectional view taken along the line 10—10 of Fig. 8;

Figure 11 is an elevational view, actual size and partly broken away to show structural details, of still another modified form of thermoelectric generating device embodying features of my invention;

Figure 12 is an enlarged fragmentary view of the device of Fig. 11, partly in section and with the tubular housing cut away to show the arrangement of the thermopile;

Figure 13 is a fragmentary sectional view taken along the line 13—13 of Fig. 12;

Figure 14 is a sectional view taken along the line 14—14 of Fig. 12;

Figure 15 is a sectional view taken along the line 15—15 of Fig. 12; and

Figure 16 is a fragmentary sectional view taken along the line 16—16 of Fig. 15.

Referring first to Figs. 1-6, inclusive, of the drawings, the numeral 20 denotes a burner base member threadedly receiving a gas supply conduit 21 and a member 22 having a restricted orifice 23. Communicating with said orifice is a bore 24, threaded at its upper end to receive the lower end portion of a hollow flanged member 25, and having air inlet openings 26. A mounting bracket 27 for the device is secured between members 20 and 25, a spacer 28 being interposed between the bracket and the base member.

A burner tube 29, communicating with the gas and air inlets, is received at its lower end in the bore of member 25 and carries on its upper end portion a cylindrical member 30, preferably of molded ceramic material, which is held in spaced relation to the upper surface of member 25 by a lower tube 31, ceramic washer 32 and upper tube 33. The tubes 31 and 33 are preferably of mica as they then also serve to electrically insulate the outer wall of burner tube 29. The upper and lower ends of tube 29 are flared to hold together the structure just described.

The member 32 is provided with openings 34, and the member 30 with similar openings, to receive pairs of thermocouple wires 35 which surround the tube 29. The wires of each pair are of thermoelectrically dissimilar metals, such as, for example, "Chromel" and "Copel," and the pairs are connected together in series to form a thermopile having hot junctions 36 and cold junctions 37. External electrical connecting means for the thermopile is provided by a cable 38.

The lower, or cold junction, end portions are twisted together and welded and the upper, or hot junction, end portions are arranged in parallel abutting relation and are welded at their tips. As is more clearly shown in Fig. 5, the wires of the hot junctions are disposed in radial alignment with respect to the tube 29 for conservation of space and increase of heating efficiency. Each hot junction is provided with a protective sleeve 39 of heat resistant metal.

Carried by the hot junction portions of the thermocouples is an inverted conical member 40 of ceramic, or other suitable heat resistant, material which serves to spread the flame of the gas issuing from tube 29 between the surrounding hot junctions to efficiently heat the same. When the device is employed in association with gas heating apparatus, it may be mounted with respect to the heating apparatus main burner so that the couple-heating flame also serves to ignite the main burner.

A wire 41, welded to the tip of one of the hot junctions, is bent over the top of the flame spreading member to hold the same in position. A protective tubular housing 42 for the lower end portions of the thermocouples is carried by the reduced inner portions of members 25 and 30. A member 43, secured by screws to the bracket 27, and having an opening conforming with the hexagonal outer surface of base member 20, serves to prevent accidental movement of the same with respect to the device in installation.

Referring now to the fragmentary modification shown in Fig. 7, the un-shown upper portion of the device may be the same as that shown in Figs. 1–6. A burner base member 44, having a mixing orifice member 45 and air inlet openings 46, supports a burner tube 47 by means of a threaded fitting 48. Surrounding the burner tube and cold junction end portions 49 of the thermocouples is a tubular housing 50 having air inlet openings 51 adjacent the cold junctions The area surrounding the thermocouple wires and the burner air inlet being otherwise completely enclosed by the housing, all of the air for the burner is drawn through the openings 51 and around the cold junctions, thus cooling them. As the output of a thermoelectric generating device is proportional to the difference in temperature of the hot and the cold junctions, this arrangement increases the effectiveness of the device. The mounting means shown comprises a strap member 52 in which the device may be slid to effect vertical adjustment.

The modification shown in Figs. 8, 9 and 10 will now be described. The numeral 60 indicates the wall of a heating device such as a cooking oven in which is a main burner 61. Mounted in said wall, and secured by nut 62, is a thermoelectric generating device comprising a burner base member 63 having a gas inlet member 64 and air inlet openings 65 communicating with a burner tube 66. The burner end of the device is the same as that shown in Figs. 1–6 and consequently will not be described further.

To each of the cold junction end portions 67 of the thermocouples is welded a wire 68 of high thermal conductivity, such as copper. These wires are extended through openings in supporting washers 69 and terminal washer 70, all washers being of electrical insulating material, and are secured by bending around the margin of washer 70 in spacing notches 71 (Fig. 10). The hollow inner portion of member 63 which partly surrounds the washer 70 is provided with openings 72 (Fig. 9) which permit circulation of air around the terminals of wires 68. The wires 68 function to conduct heat away from the cold junctions and thus increase the thermoelectric output of the device.

In Figs. 11–16, inclusive, I have shown a further modified form of thermoelectric generating device which, when in use, may be heated, for example, by the flame of a pilot burner.

The device comprises a two-couple thermopile, the respective wires of which are indicated at 80, 81 and 82, 83. Wires 80 and 82 are composed of similar metal and wires 81 and 83 of metal thermoelectrically dissimilar to that of wires 80 and 82. Hot junctions 84 and 85 (Fig. 12) are formed by the welding of wires 80 and 81 and wires 82 and 83, respectively. A first cold junction 86 is formed between wires 81 and 82 and the terminals of wires 80 and 83 welded to output conducting leads 87 and 88 form, effectively, the second cold junction.

The couples are supported in a tubular protective housing 89 by members 90 of ceramic, or other suitable heat resistant insulating, material and the outer wires 80 and 83 of the thermopile extend through insulated openings in a metallic member 91 which may conveniently be spot welded, as at 92, to the housing 89. The housing 89 may be of heat resistant metal, such as stainless steel, and is closed at its hot end by a disk 93 of similar metal welded thereto. A mica disk 94 serves to prevent possible contact of the hot junctions with the end wall of the housing.

Welded to the cold junction 86 is a wire 95 of metal of high thermal conductivity, such as copper, which extends through an insulated opening in member 91 and along with wires 87 and 88 in cable 96, the three wires being suitably electrically insulated from one another and from the sheath.

The wire 95 may extend throughout the length of the cable or may terminate, as shown, within the cable. This wire functions to increase the thermoelectric output of the device by conducting heat away from the cold junction 86. By its use, the device may be made relatively short, with resultant saving of materials.

While I have shown and described specific embodiments of the features of my invention, it is obvious that modifications may be made therein without departing from the spirit of my invention. I intend therefore that my invention be limited only by the scope of the appended claims.

I claim as my invention:

1. In a thermoelectric power generating device adapted for mounting in a furnace chamber in the vicinity of the main burner thereof: a tubular gas burner, a plurality of pairs of elongated thermocouple elements joined together at their ends in electrical series to form a group of hot and of cold junctions, said elements surrounding said tubular burner and being disposed in substantially parallel axial relation thereto, said hot junctions being so positioned as to be heated by the flame of said tubular burner, the length of said elements being such that said cold junctions are in a region of said furnace subjected to the heat produced by the flame of said main burner, and metallic heat conductors respectively joined to said cold junctions and terminating in a region the temperature of which is substantially lower than that of the region of said cold junctions.

2. In a thermoelectric power generating device: a tubular gas burner, a plurality of pairs of elongated thermocouple elements joined together at their ends in electrical series to form a group of hot and of cold junctions, said elements surrounding said burner and being disposed in substantially parallel axial relation thereto, said hot junctions being so positioned as to be heated by the flame of said burner, the length of said elements and their position with respect to said burner being such that said cold junctions are substantially affected by the heat of the burner, and metallic heat conductors respectively joined to said cold junctions and extended to a region of substantially lower temperature than that of said cold junctions.

3. In a thermoelectric power generating device: a tubular gas burner, a plurality of pairs of elongated thermocouple elements joined together at their ends in electrical series to form a group of hot and of cold junctions, said elements surrounding said burner and being disposed in substantially parallel axial relation thereto, said hot junctions being so positioned as to be heated by the flame of said burner, the length of said elements and their position with respect to said burner being such that said cold junctions are substantially affected by the heat of the burner, metallic heat conductors respectively joined to said cold junctions and extended to a region of substantially lower temperature than that of said cold junctions, and a tubular housing surrounding said cold junctions and a substantial portion of said elements and said conductors.

4. In a thermoelectric generating device, a burner having a restricted gas inlet and a first air inlet adjacent said gas inlet, a thermocouple associated with said burner and having a hot junction arranged to be heated by the flame of said burner and a cold junction, a housing for said cold junction and having a second air inlet adjacent said cold junction, and means fluidly connecting said first and said second air inlets.

5. In a thermoelectric generating device, a tubular burner having a restricted gas inlet and a first air inlet adjacent said gas inlet, a plurality of elongated thermocouple elements surrounding said burner and having hot and cold junctions, said hot junctions being arranged to be heated by the flame of said burner, and a housing surrounding said cold junctions and the portion of said burner having said first air inlet, said housing being provided with a second air inlet adjacent said cold junctions.

WILLIAM R. RAY.